US012756689B2

(12) United States Patent
Lee

(10) Patent No.: US 12,756,689 B2
(45) **Date of Patent: *Oct. 6, 2026**

(54) DETECTING AND PREVENTING TRANSMISSION OF SPAM MESSAGES USING MODIFIED SOURCE NUMBERS

(71) Applicant: Proofpoint, Inc., Sunnyvale, CA (US)

(72) Inventor: Thomas Lee, Kensington, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,843

(22) Filed: Nov. 4, 2024

(65) Prior Publication Data

US 2025/0063020 A1 Feb. 20, 2025

Related U.S. Application Data

(63) Continuation of application No. 17/324,952, filed on May 19, 2021, now Pat. No. 12,224,983.

(60) Provisional application No. 63/107,235, filed on Oct. 29, 2020.

(51) Int. Cl.
*H04L 9/40* (2022.01)
*G06N 20/00* (2019.01)
*H04L 51/212* (2022.01)

(52) U.S. Cl.
CPC ........ *H04L 63/0245* (2013.01); *H04L 51/212* (2022.05); *H04L 63/1491* (2013.01); *H04L 63/20* (2013.01); *G06N 20/00* (2019.01)

(58) Field of Classification Search
CPC ............... H04L 63/0245; H04L 51/212; H04L 63/1491; H04L 63/20; G06N 20/00
See application file for complete search history.

(56) References Cited

U.S. PATENT DOCUMENTS 9,037,665 B2 5/2015 Mikan et al.
10,178,060 B2 1/2019 Wood
10,298,598 B1 * 5/2019 McClintock ........ H04L 63/1483
(Continued)

FOREIGN PATENT DOCUMENTS

WO 2018213457 A1 11/2018

OTHER PUBLICATIONS

Mar. 14, 2022—(EP) Extended Search Report—App 21200608.4.

*Primary Examiner* — Linglan Edwards
*Assistant Examiner* — Jacob Benedict Knackstedt
(74) *Attorney, Agent, or Firm* — Banner & Witcoff, Ltd.

(57) ABSTRACT

Aspects of the disclosure relate to detecting and preventing transmission of spam messages using modified source numbers. A computing platform may detect that a first message, sent to a recipient device from a sender device, includes suspicious content. Subsequently, the computing platform may receive, from the recipient device, user interaction information indicating that a user of the recipient device has sent a reply message in response to the first message. Then, the computing platform may generate a modified message by modifying a first source number corresponding to the reply message. Next, the computing platform may cause transmission of the modified message with the modified first source number to the sender device. Thereafter, the computing platform may intercept one or more additional messages between the sender device and the modified first source number and redirect the one or more additional messages.

21 Claims, 9 Drawing Sheets

(56) References Cited

U.S. PATENT DOCUMENTS

| | | | | |
|---|---|---|---|---|
| 11,102,244 | B1 * | 8/2021 | Jakobsson | H04L 51/42 |
| 2005/0204012 | A1 | 9/2005 | Campbell | |
| 2012/0324094 | A1 * | 12/2012 | Wyatt | H04W 4/60 709/224 |
| 2016/0110422 | A1 * | 4/2016 | Roytman | H04M 7/00 706/12 |
| 2020/0053111 | A1 * | 2/2020 | Jakobsson | H04L 63/1416 |
| 2020/0053120 | A1 | 2/2020 | Wilcox | |
| 2020/0067861 | A1 | 2/2020 | Leddy et al. | |
| 2021/0044554 | A1 | 2/2021 | Toper | |

* cited by examiner

DETECTING AND PREVENTING TRANSMISSION OF SPAM MESSAGES USING MODIFIED SOURCE NUMBERS

CROSS-REFERENCE TO RELATED APPLICATIONS

This application is a continuation of and claims priority to co-pending U.S. application Ser. No. 17/324,952, filed May 19, 2021, and entitled "Detecting and Preventing Transmission of Spam Messages Using Modified Source Numbers," which claims the benefit of and priority to U.S. Provisional Patent Application Ser. No. 63/107,235, filed Oct. 29, 2020, and entitled "Rewriting A/B Numbers to the ENUM Result," all of which are incorporated by reference herein in their entirety.

TECHNICAL FIELD

Aspects of the disclosure relate to message processing and management systems, data processing methods, and communication systems and networks. In particular, one or more aspects of the disclosure relate to detecting and preventing transmission of spam messages using modified source numbers.

BACKGROUND

Increasingly, organizations and individuals face various cybersecurity threats through electronic communications. Some increasingly common cybersecurity threats include spam or phishing messages, particularly those deployed through text messaging and other related communications. Typically, for example, if a recipient responds to a spam message, the sender of the spam message will send even more messages to the recipient, thereby triggering a 'spam attack' on the recipient. In many instances, it may be difficult to efficiently and effectively protect unsuspecting message recipients from such spam attacks.

SUMMARY

Aspects of the disclosure provide technical solutions that overcome one or more of the technical problems described above and/or other technical challenges. For instance, one or more aspects of the disclosure relate to detecting that a message recipient has sent a response message to a spammer (e.g., a sender of spam or unsolicited messages), rewriting a source number of the response message before sending the response message to the spammer, sending the response message to the spammer, and intercepting one or more additional spam messages from the spammer. In some instances, the one or more additional spam messages from the spammer may be intercepted using a honeypot.

In accordance with one or more embodiments, a computing platform having at least one processor, a communication interface, and memory may detect that a first message, sent to a recipient device from a sender device, includes suspicious content. Subsequently, the computing platform may receive, via the communication interface, from the recipient device, user interaction information indicating that a user of the recipient device has sent a reply message in response to the first message. Then, the computing platform may generate a modified message by modifying a first source number corresponding to the reply message. Next, the computing platform may cause transmission of the modified message with the modified first source number to the sender device.

Thereafter, the computing platform may intercept one or more additional messages between the sender device and the modified first source number and redirect the one or more additional messages.

In some embodiments, the computing platform may, based on receiving the user interaction information, transmit an instruction, to a messaging service center, that causes the messaging service center to drop the reply message.

In some embodiments, the computing platform may classify the first message as potential spam, spam, or non-spam.

In some embodiments, redirecting the one or more additional messages may include redirecting the one or more additional messages to a honeypot.

In some embodiments, redirecting the one or more additional messages may include redirecting the one or more additional messages to a security policy enforcement entity.

In some embodiments, modifying the first source number corresponding to the reply message may include rewriting a phone number associated with the recipient device. In addition, rewriting the phone number associated with the recipient device may include rewriting the phone number to correspond to a honeypot.

In some embodiments, the computing platform may train one or more machine learning algorithms using the intercepted one or more additional messages received from the sender device.

In some embodiments, the computing platform may modify a second source number corresponding to the first message sent to the recipient device, and send the first message with the modified second source number to the recipient device, the modified second source number indicating that the first message includes suspicious content.

In some embodiments, the first message may include at least one of a short message service (SMS) message or a multimedia messaging service (MMS) message.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving security in electronic communications between users and/or communications sent from organization to users. One or more aspects of the disclosure thus provide technical solutions to various technical problems associated with protecting unsuspecting message recipients from spam attacks. Examples described herein provide a way of rewriting a recipient's phone number before sending their initial response message to a spammer, so as to reroute further messages from the spammer to a honeypot instead of to the recipient.

Figure 1:
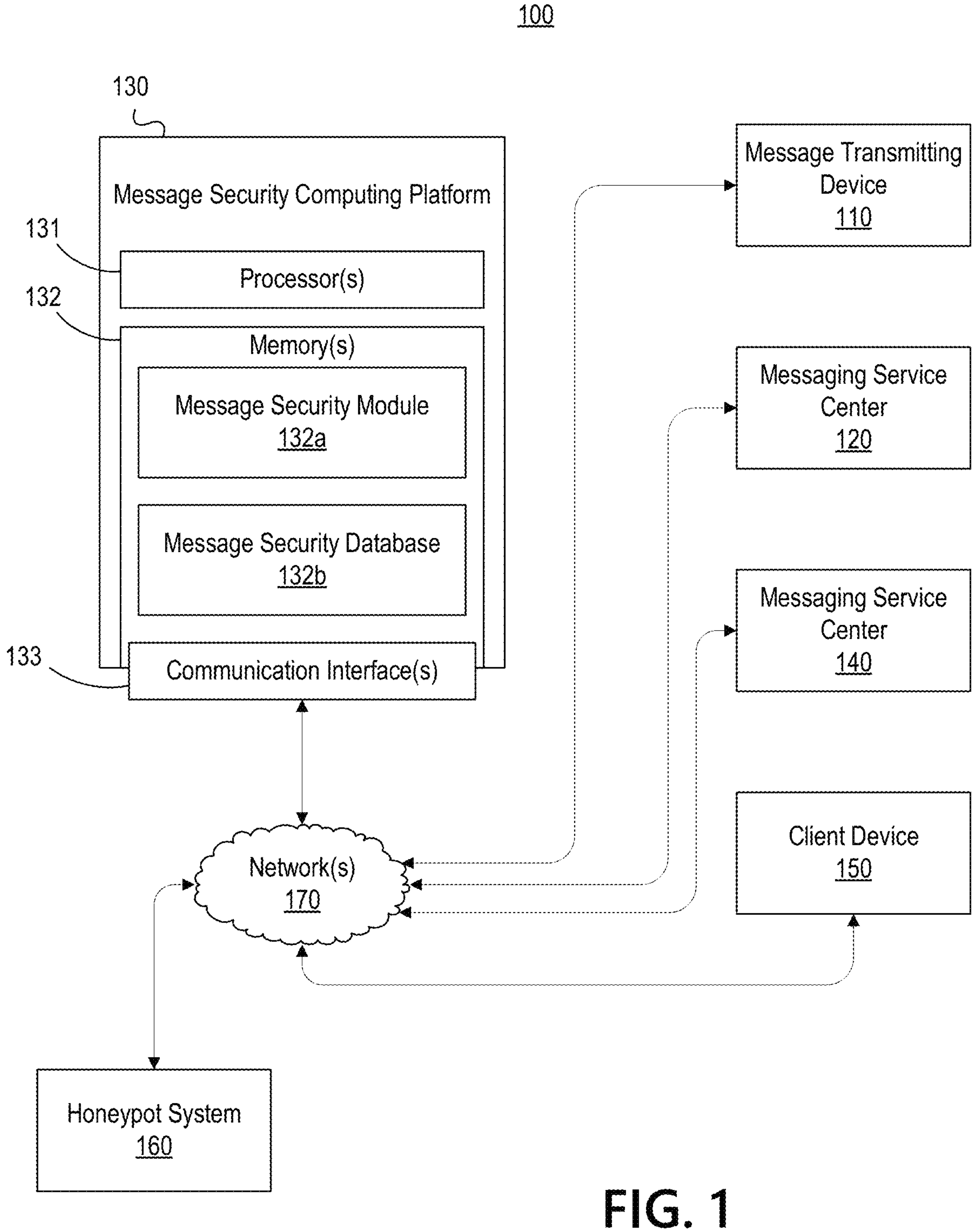
FIG. 1 depicts an illustrative computing environment for detecting and preventing transmission of spam messages using modified source numbers in accordance with one or more example embodiments.

FIG. 1 depicts an illustrative operating environment for detecting and preventing transmission of spam messages using modified source numbers in accordance with one or more example embodiments. Referring to FIG. 1, computing environment 100 may include various computer systems, computing devices, networks, and/or other operating infrastructure. For example, computing environment 100 may include a message transmitting device 110, messaging service centers 120 and 140, a message security computing platform 130, a client device 150, a honeypot system 160, and one or more network(s) 170.

Network(s) 170 may include one or more wired networks and/or one or more wireless networks that interconnect the message transmitting device 110, messaging service centers 120 and 140, message security computing platform 130, client device 150, honeypot system 160, and/or other computer systems and/or devices. In addition, each of the message transmitting device 110, messaging service centers 120 and 140, message security computing platform 130, client device 150, and honeypot system 160, may be special purpose computing devices configured to perform specific functions, as illustrated in greater detail below, and may include specific computing components such as processors, memories, communication interfaces, and/or the like.

Message security computing platform 130 may include one or more processor(s) 131, one or more memory(s) 132, and one or more communication interface(s) 133. In some instances, message security computing platform 130 may be made up of a plurality of different computing devices (e.g., arranged as a computing platform), which may be distributed within a single data center or a plurality of different data centers. In these instances, the one or more processor(s) 131, one or more memory(s) 132, and one or more communication interface(s) 133 included in message security computing platform 130 may be part of and/or otherwise associated with the different computing devices that form message security computing platform 130.

In one or more arrangements, processor(s) 131 may control operations of message security computing platform 130. Memory(s) 132 may store instructions that, when executed by processor(s) 131, cause message security computing platform 130 to perform one or more functions, as discussed below. Communication interface(s) 133 may include one or more wired and/or wireless network interfaces, and communication interface(s) 133 may connect message security computing platform 130 to one or more networks (e.g., network 170) and/or enable message security computing platform 130 to exchange information and/or otherwise communicate with one or more devices connected to such networks.

In one or more arrangements, memory(s) 132 may store and/or otherwise provide a plurality of modules (which may, e.g., include instructions that may be executed by processor(s) 131 to cause message security computing platform 130 to perform various functions) and/or databases (which may, e.g., store data used by message security computing platform 130 in performing various functions). For example, memory(s) 132 may store and/or otherwise provide message security module **132*a* and message security database 132*b*. In some instances, message security module 132*a* may store instructions that cause message security computing platform 130 to execute one or more other functions described herein. Additionally, message security database 132*b* may store data that is used by message security computing platform 130** in executing one or more other functions described herein.

Message transmitting device 110 may be configured to send character-limited messages using a communications service (e.g., SMS). The message transmitting device 110 may be a client device used by a user (e.g., in the case of one user sending an SMS to another user) or alternately could be a non-user device. For example, server devices are often used to send character-limited messages to large numbers of users, e.g., for notification purposes, for spam purposes, or sometimes to send malicious content as part of a cybersecurity attack. The message transmitting device 110 thus may include any device that sends a character-limited message for any purpose.

Client device 150 may be configured to be used by respective users (who may, e.g., be employees of an enterprise organization and/or customers of a communications service provider) to receive character-limited messages from the message transmitting device 110, as well as to send character-limited messages. The client devices could be user-owned devices, employer-provided devices, or other types of devices used by respective users. The client device 150 may be configured to present one or more user interfaces associated with messaging functions as described below.

As will be apparent to a person of ordinary skill, a communication system will have many client devices, and any given client device may be able to receive and send various types of messages, including character-limited messages, from and to any number of other devices, but the message transmitting device 110 and client device 150 described herein represent a respective sender and recipient in an example character-limited message transmission used to illustrate aspects of the disclosure. Thus, although the examples below describe the message transmitting device 110 sending exemplary character-limited message(s) to the client device 150, some aspects of the disclosure may include many client and/or message transmitting devices, all capable of sending various messages, including character-limited messages, to each other.

Messaging service centers 120 and/or 140 may be devices used by one or more communications service providers to forward electronic communications between devices, including to and from the message transmitting device 110 and the client device 150. As an example, the messaging service center may be and/or include an SMS-C (short message service center). The messaging service centers 120 and 140 may be located within communication networks that provide communication services to the message transmitting device 110 and/or client device 150. In one example, the messaging service center 120 may be part of a cellular or other network providing communications service to the messaging transmitting device 110, and the messaging service center 140 may be part of a cellular or other network providing communications service to the client device 150. In another example, both messaging service center 120, 140 may be part of a cellular network providing communications service to the client device 150, and the message transmitting device 110 might not have a wireless cellular communication.

Honeypot system 160 may be and/or include one or more computing devices (e.g., servers, server blades, enterprise devices, or the like) that may be configured to emulate any network device (e.g., a client device 150). For example, the honeypot 170 may be a computer system (e.g., a decoy computer system) used to counteract attempts at unauthorized use of information systems (e.g., spam attacks).

Character-limited messages may include any message that can only fit a maximum number of characters in a single message. One example of a character-limited message is a short message service (SMS) message because SMS messages can only fit 160 characters in a single message. Similarly, a multimedia messaging service (MMS) message is a character-limited message. Alternatively, a character-limited message may be any type of message with a character limit, including character-limited messages sent using social media networks and/or websites, other types of character-limited text messages besides SMS/MMS, and/or instant messages with a character limit.

Figure 2A:
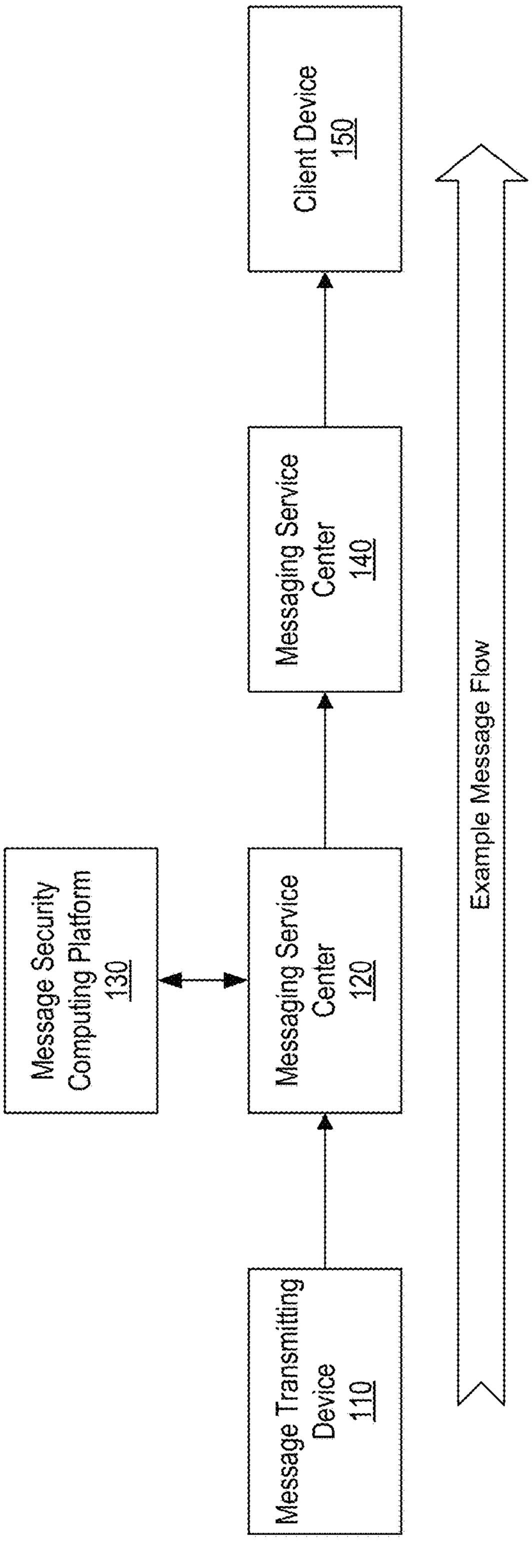
FIGS. 2A-2B depict two illustrative logical flows for detecting and preventing transmission of spam messages using modified source numbers in accordance with one or more example embodiments.
Figure 2B:
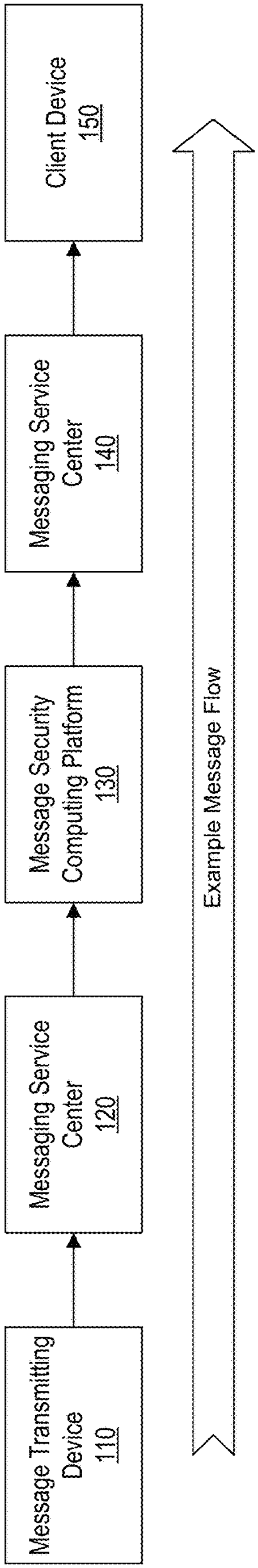

FIGS. 2A and 2B depict two illustrative logical flows for detecting and preventing transmission of spam messages using modified source numbers in accordance with one or more example embodiments. Referring to FIG. 2A, in some cases message security computing platform 130 may be outside the message flow of one or more example character-limited message(s). In this example, the character-limited message(s) sent by the message transmitting device 110 to the client device 150 may be initially received by the messaging service center 120. As described in more detail below, the messaging service center 120 may be configured to, prior to forwarding the message(s) on to messaging service center 140, first send the received message(s) to the message security computing platform 130 for a security check and/or modification, and the message security computing platform 130, in turn, may be configured to respond by indicating the original message(s) should be dropped and new and/or modified character-limited message(s) should be injected instead, as further described in detail below. The messaging service center 120 would then forward the injected character-limited message(s) on to the messaging service center 140 for eventual delivery to the client device 150. Thus, in this example architecture, the message security computing platform 130 need not be tightly integrated into a communication provider network. Although FIG. 2A illustrates two messaging service center devices within the message flow, fewer or more messaging service center devices could be included in a flow (e.g., depending on the distance between the message transmitting device 110 and client device 150, a particular network architecture, whether the message is sent across networks or within a network, etc.). Additionally, other devices could be included a flow. Additionally or alternatively, the messaging service center 140 (instead of the messaging service center 120) could send the message(s) to the message security computing platform 130 for checking and/or modification.

Referring to FIG. 2B, in some cases the message security computing platform 130 may be within a message flow. In this example, the message security computing platform 130 may be integrated into one or more particular provider network(s), such that example character-limited message(s) may be received by the message security computing platform 130 from a message transmitting device 110 and/or messaging service center 120, and may then perform security checking and/or modification before forwarding the new and/or modified message(s) on towards the client device 150 for delivery. Thus, in this example, the message security computing platform 130 may be tightly integrated into the messaging flow, which may be faster and more efficient.

Figure 3A:
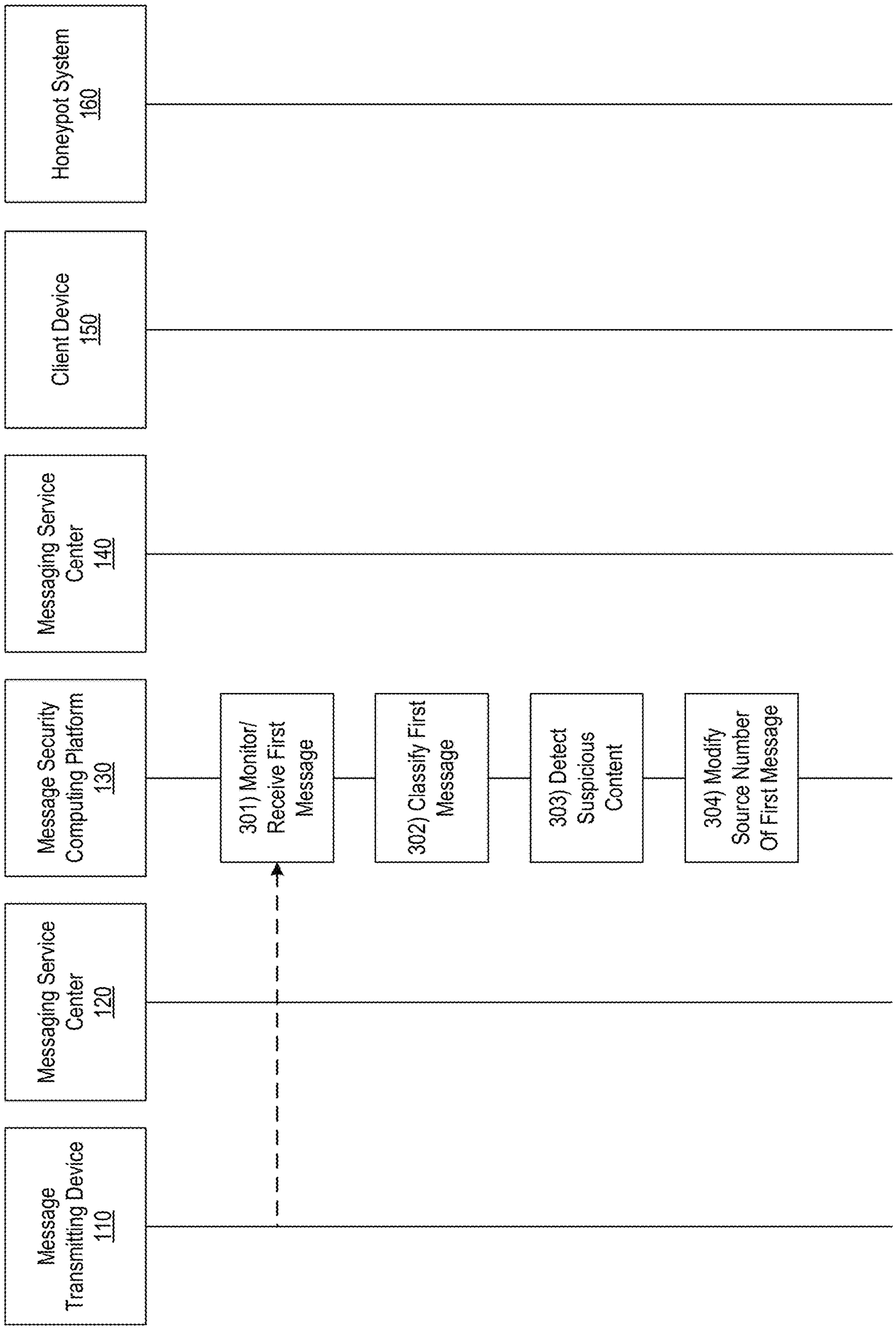
FIGS. 3A-3D depict an illustrative event sequence for detecting and preventing transmission of spam messages using modified source numbers in accordance with one or more example embodiments.

FIGS. 3A-3D depict an illustrative event sequence for detecting and preventing transmission of spam messages using modified source numbers in accordance with one or more example embodiments. Referring to FIG. 3A, at step 301, the message security computing platform 130 may monitor and receive, via a communication interface (e.g., communication interface 133), from a sender device (e.g., message transmitting device 110), one or more character-limited messages for delivery to a recipient device (e.g., client device 150). In some cases, only a single message may be received at a time, and the message security computing platform 130 may follow the steps described below for each individual message separately. In some cases, multiple messages may be received together or shortly apart, and the message security computing platform 130 may act on the multiple messages together as part of the process described below. For example, if multiple messages are received within a time period (e.g. one second), the messages may be treated together.

At step 302, the message security computing platform 130 may classify a first message from the sender device (e.g., message transmitting device 110). For example, the message security computing platform 130 may classify the first message as potential spam, spam, or non-spam. Additionally or alternatively, the message security computing platform 130 may classify the first message based on message type (e.g., a political message, an informative message, an advertisement, a public safety message, a notification or alert message, a personal message, a botnet message, etc.).

At step 303, the message security computing platform 130 may detect that the first message includes suspicious content. For example, the message security computing platform 130 may scan or evaluate the message for suspicious content and determine that the first message is likely a spam message.

At step 304, in some embodiments, the message security computing platform 130 may modify (e.g., rewrite) a source number corresponding to the first message sent to the recipient device (e.g., from message transmitting device 110).

Figure 3B:
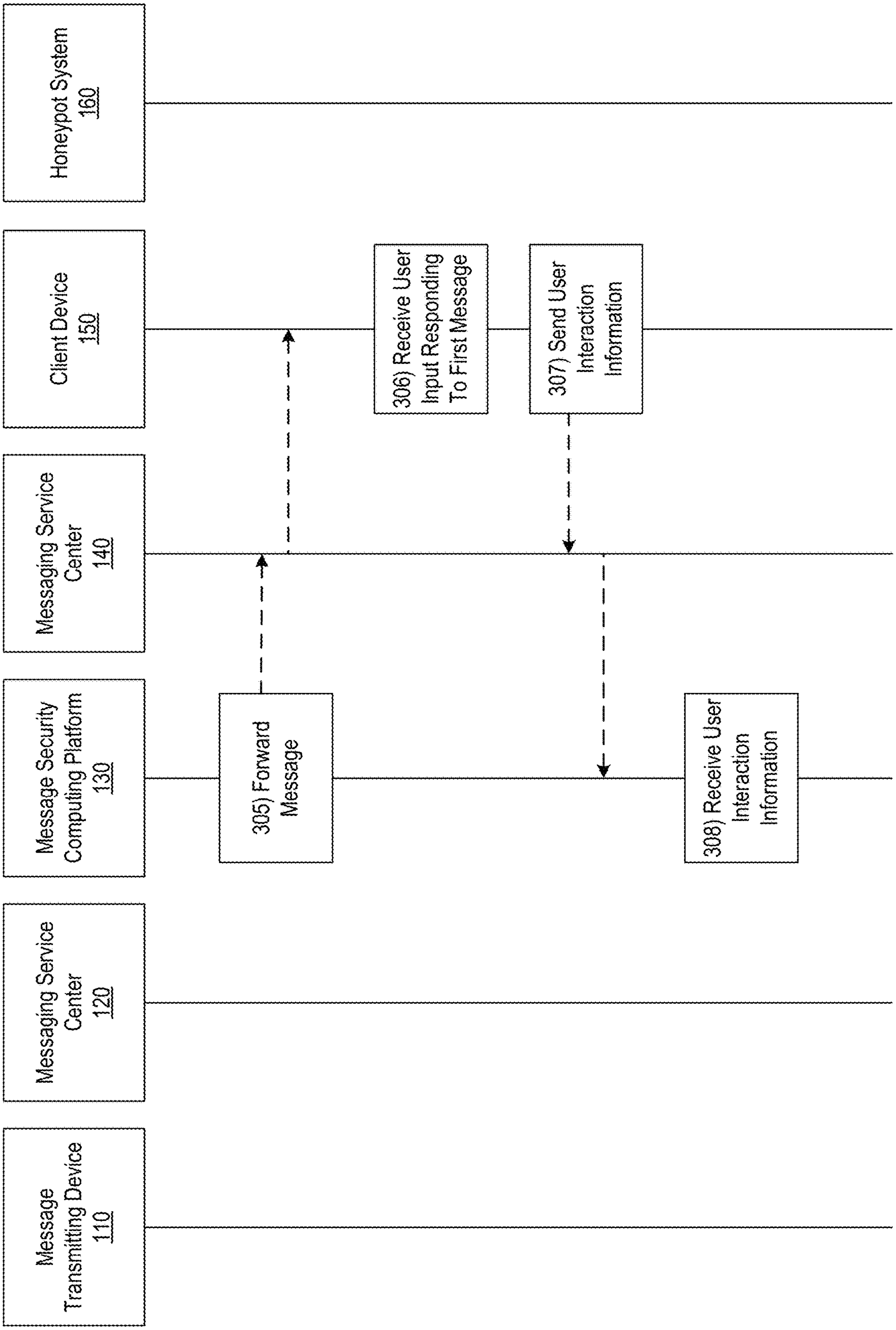
Figure 4:
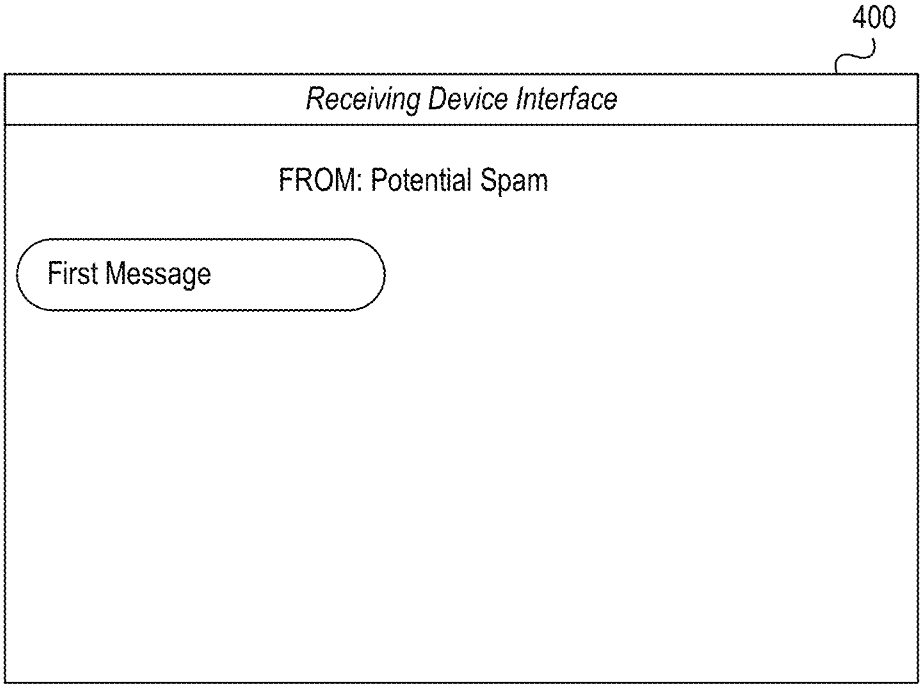
FIGS. 4-7 depict example graphical user interfaces for detecting and preventing transmission of spam messages using modified source numbers in accordance with one or more example embodiments.

Referring to FIG. 3B, at step 305, the message security computing platform 130 may send, via the communication interface (e.g., communication interface 133), the message with the modified source number to the recipient device (e.g., client device 150). For example, in rewriting the source number corresponding to the first message sent to the recipient device and sending the message with the modified source number to the recipient device, the message security computing platform 130 may cause the recipient device (e.g., client device 150) to display a graphical user interface similar to graphical user interface 400, which is illustrated in FIG. 4. As seen in FIG. 4, graphical user interface 400 may include text and/or other information associated with the modified source number indicating to the recipient that the first message includes suspicious content. For instance, the source number corresponding to the first message sent to the recipient device may rewritten into an alphanumeric character string (e.g., "Potential Spam") or a warning message of some form.

A step 306, the recipient device (e.g., client device 150) may receive user interaction (e.g., user input) indicating a response to the first message. For example, after sending an initial message that was classified as likely being a spam message to the message recipient, the message security computing platform 130 may detect that the message recipient has sent a reply (response) message back to the spammer in response to the initial (and likely spam) message. The reply message may be a character-limited message. At step 307, the recipient device (e.g., client device 150) may send, via the communication interface (e.g., communication interface 133), the user interaction information (e.g., the response to the first message) to the message security computing platform 130. In turn, at step 308, the message security computing platform 130 may receive, via the communication interface (e.g., communication interface 133), the user interaction information.

Figure 3C:
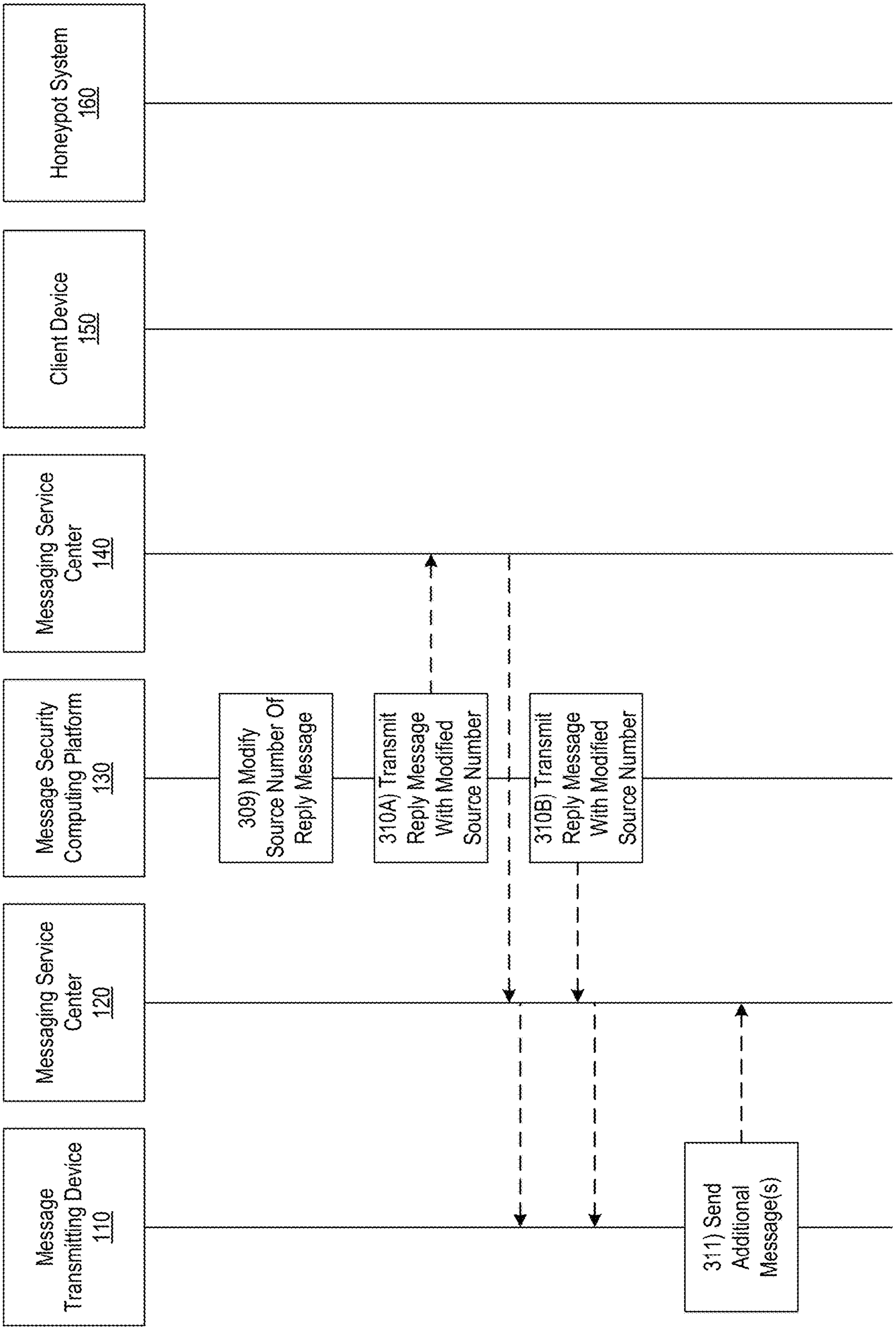
Figure 5:
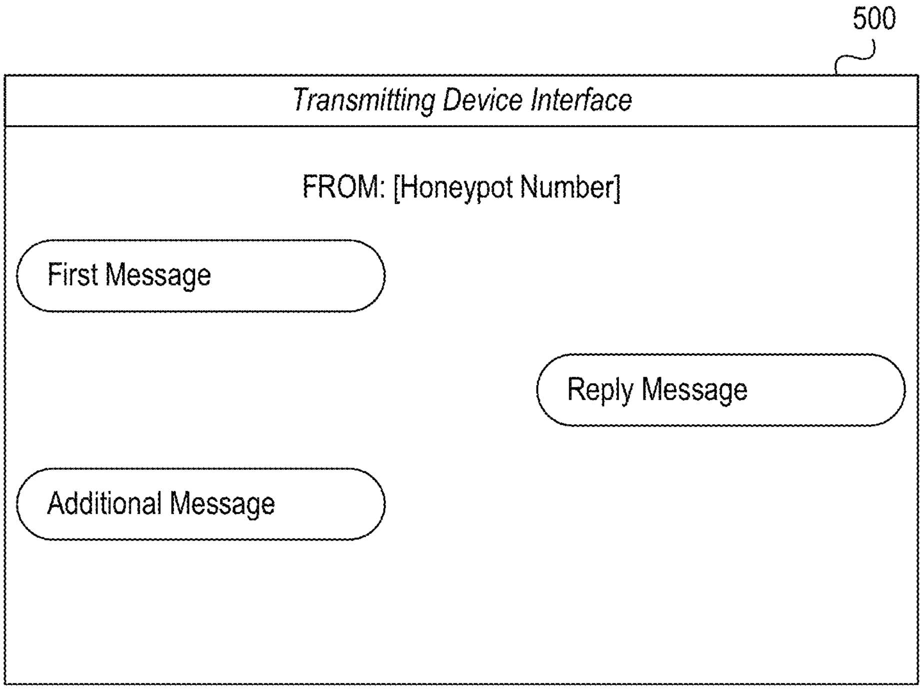

Referring to FIG. 3C, at step 309, the message security computing platform 130 may generate a modified message by modifying a source number corresponding to the reply message. For example, in modifying the source number corresponding to the reply message, the message security computing platform 130 may rewrite a phone number associated with the recipient device (e.g., client device 150). For instance, the message security computing platform 130 may rewrite the source number of the reply message, in accordance with specifications defined in one or more RFCs, to correspond to a honeypot that is hosted by the message security computing platform 130 or by another server associated with the message security computing platform 130. By rewriting the source number in this way, the message security computing platform 130 may prevent the spammer from receiving the reply message and identifying that the message recipient fell for and responded to the original spam message (e.g., the first message). For example, in some instances, the message security computing platform 130 may cause the sender device (e.g., message transmitting device 110) to display and/or otherwise present one or more graphical user interfaces similar to graphical user interface 500, which is illustrated in FIG. 5. As seen in FIG. 5, the phone number associated with the recipient device (e.g., client device 150), which has sent the reply message in response to the first message, may be rewritten to correspond to a honeypot (e.g., "FROM: [Honeypot Number]"). In such instances, further messages from the sender would be rerouted to the honeypot instead of to the recipient.

At steps 310A/310B, the message security computing platform 130 may cause transmission of the reply message with the modified source number to the sender device (e.g., message transmitting device 110). Step 310A may be performed in a system set up according to the example first architecture of FIG. 2A. In this example, the message security computing platform 130 is not part of the message flow, so the message security computing platform 130 may instruct the messaging service center 140 from which it received the original reply message at step 308 to drop the original reply message and inject the reply message with the modified source number (e.g., as modified at step 309) into the message flow in place of the dropped message. Thus, the message security computing platform 130 may transmit one or more instructions to the messaging service center 140 to cause the replacement of the original reply message with the reply message having the modified source number, and the messaging service center 140 in turn may then prevent transmission of the original reply message to the sender device (e.g., message transmitting device 110), and instead transmit the modified reply message on to the next device in the message flow pathway (e.g., messaging service center 120), which in turn transmits the modified reply message to the sender device (e.g., message transmitting device 110).

The one or more instructions may include the full content of the modified reply message and the modified source number and/or instructions for how the messaging service center 120 can modify the original reply message to obtain the modified reply message with the modified source number. For example, the message security computing platform 130 may indicate to the messaging service center 120 what modified source number should be used and provide the modified source number, along with any other instructions for modifying the message, or may simply send the modified reply message with the modified source number in its entirety along with an indication of which message the modified reply message should replace.

As an alternative to step 310A, step 310B may be performed in a system set up according to the example second architecture of FIG. 2B. In this example, the message security computing platform 130 is part of the message flow, so the message security computing platform 130 may simply forward the modified reply message to the next device (e.g., messaging service center 120) in the message flow pathway, which in turn sends the modified reply message on to the sender device (e.g., message transmitting device 110), which is the destination device for the message.

Figure 3D:
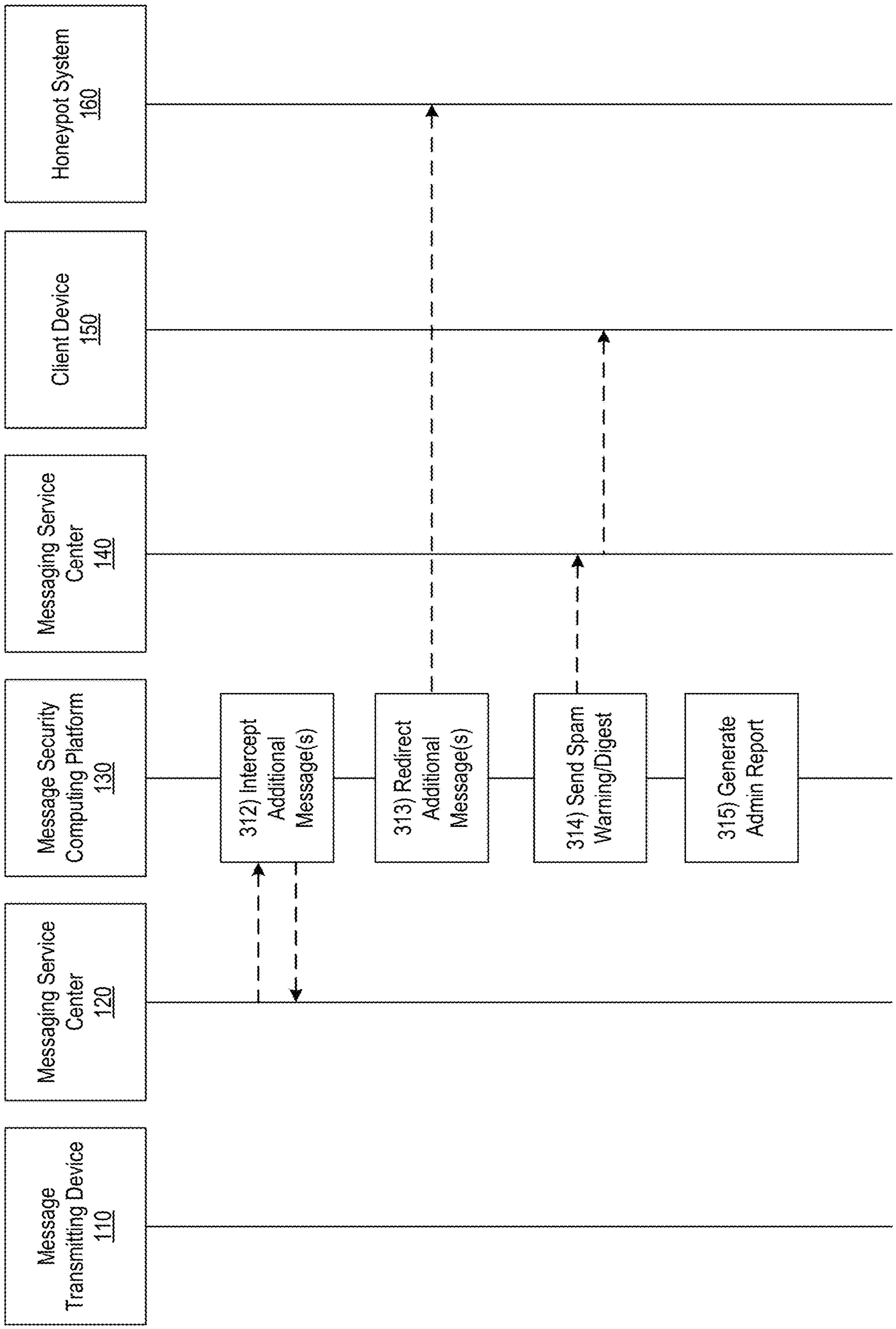

In some embodiments, at step 311, the sender device (e.g., message transmitting device 110) may send one or more additional messages to the recipient device (e.g., client device 150). Referring to FIG. 3D, at step 312, the message security computing platform 130 may intercept the one or more additional messages between the sender device (e.g., message transmitting device 110) and the modified source number (e.g., the modified source number corresponding to the reply message). For example, the message security computing platform 130 may send the reply message, with the rewritten source number, on to the spammer, and subsequently may intercept additional messages that are received from the spammer and being sent back to the rewritten source number. As a result, the message recipient may be protected from receiving these additional messages from the spammer. In some embodiments, the one or more additional messages from the spammer may be intercepted using a honeypot. For example, the additional messages may be routed to a honeypot, where they may be evaluated further and/or used in tuning and/or training one or more spam detection algorithms (e.g., machine learning algorithms).

At step 313, the message security computing platform 130 may redirect the one or more additional messages. In some examples, the message security computing platform 130 may redirect the one or more additional messages to a honeypot (e.g., honeypot system 160). In some examples, the message security computing platform 130 may redirect the one or more additional messages to a security policy enforcement entity.

Figure 6:
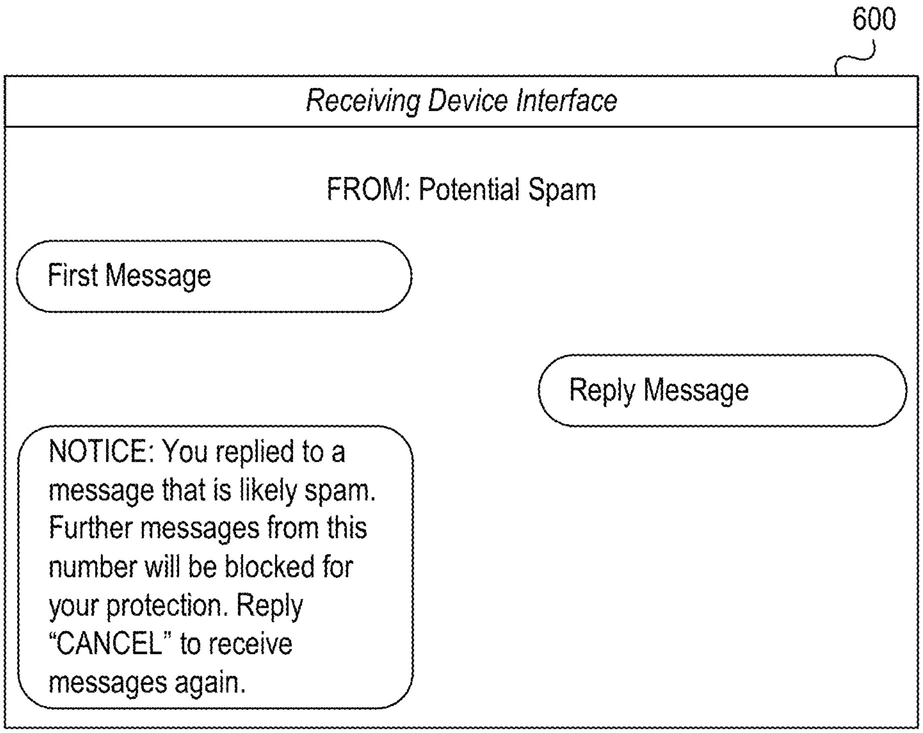

Additionally or alternatively, at step 314, the message security computing platform 130 may send a spam warning or digest to the recipient device (e.g., client device 150). For example, in some instances, in sending a spam warning or digest to the recipient device (e.g., client device 150), the message security computing platform 130 may cause the recipient device (e.g., client device 150) to display and/or otherwise present one or more graphical user interfaces similar to graphical user interface 600, which is shown in FIG. 6. As seen in FIG. 6, graphical user interface 600 may include text and/or other information notifying the user of the recipient device that he or she has replied to a message that is likely spam, and therefore any additional messages from the sender of the first message will be automatically blocked (e.g., "NOTICE: You replied to a message that is likely spam. Further messages from this number will be blocked for your protection. Reply "CANCEL" to receive messages again."). It will be appreciated that other and/or different notifications may also be provided.

Figure 7:
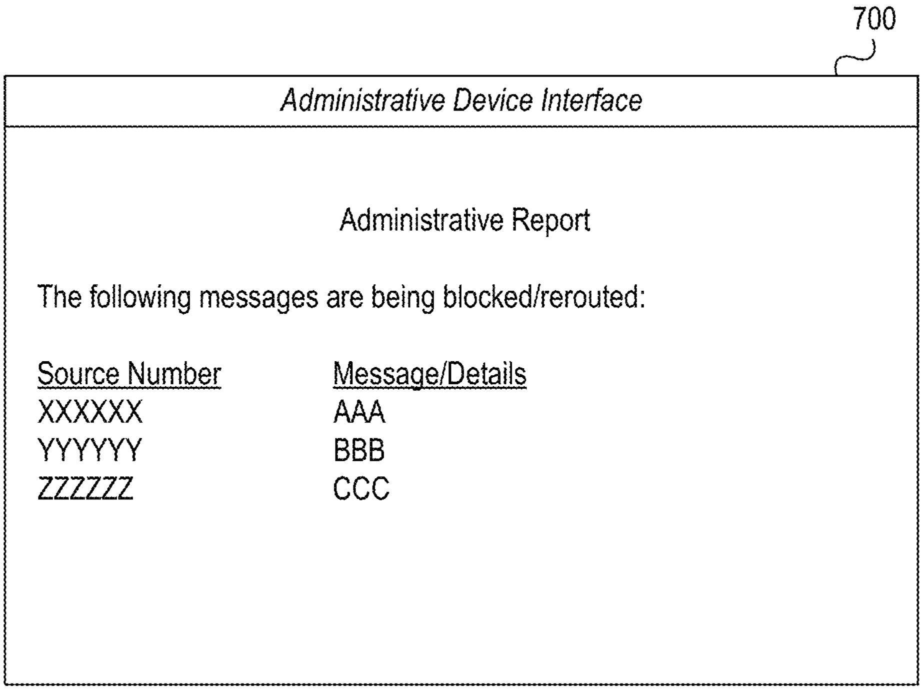

Additionally or alternatively, returning to FIG. 3D, at step 315, the message security computing platform 130 may generate an administrative report indicating messages and source numbers being blocked and/or rerouted to the honeypot. FIG. 7 shows a potential graphical user interface 700 that may be used by an administrative device (e.g., of message security computing platform 130) that receives an administrative report. As illustrated in FIG. 7, in the administrative report may include information such as the source number (e.g., "Source Number [XXXXXX], [YYYYYY], [ZZZZZZ]"), and the message and/or corresponding details thereof (e.g., "Message/Details [AAA], [BBB], [CCC]"), that are being blocked and/or rerouted to a honeypot. It will be appreciated that other and/or different notifications or reports may also be provided.

Figure 8:
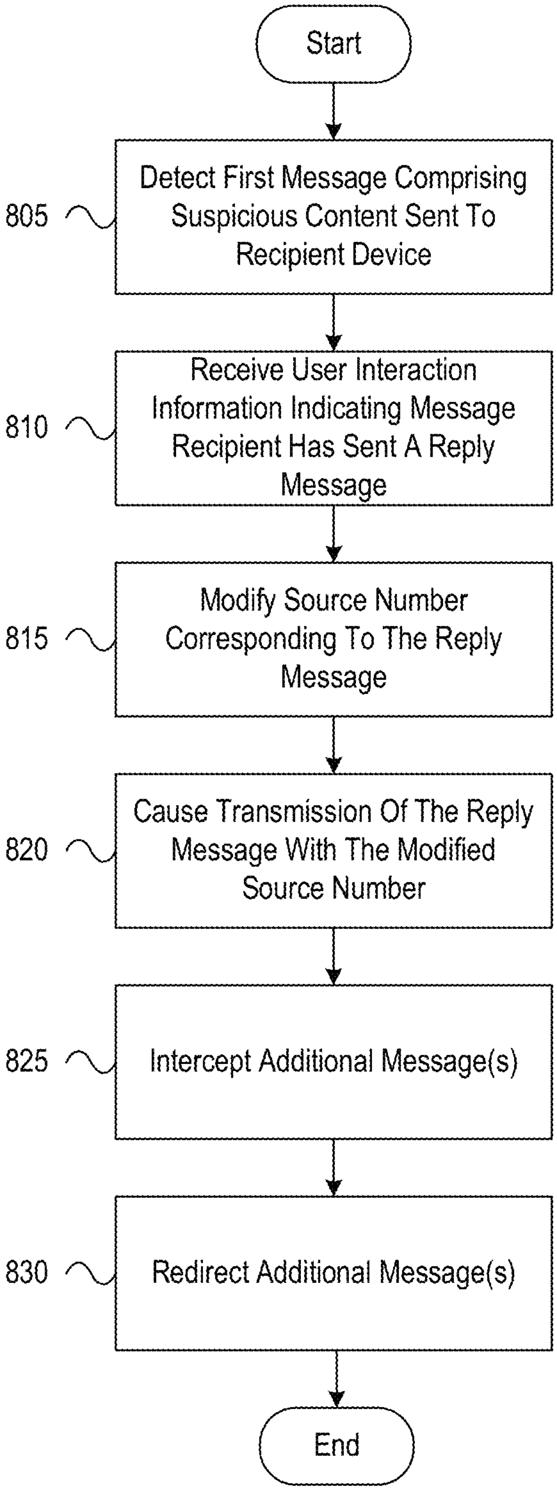
FIG. 8 depicts an illustrative method for detecting and detecting and preventing transmission of spam messages using modified source numbers in accordance with one or more example embodiments.

FIG. 8 depicts an illustrative method for detecting and preventing transmission of spam messages using modified source numbers in accordance with one or more example embodiments. Referring to FIG. 8, at step 805, a computing platform having at least one processor, a communication interface, and memory may detect that a first message, sent to a recipient device from a sender device, comprises suspicious content. At step 810, the computing platform may receive, from the recipient device, user interaction information indicating that a user of the recipient device has sent a reply message in response to the first message. At step 815, the computing platform may generate a modified message by modifying a source number corresponding to the reply message. At step 820, the computing platform may cause transmission of the modified message with the modified source number to the sender device (e.g., to a messaging service center, which will forward the modified message(s) with the modified source number on for eventual delivery to a message transmitting device). At step 825, the computing platform may intercept one or more additional messages between the sender device and the modified source number. At step 830, the computing platform may redirect the one or more additional messages.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

receive, from a recipient device different from the computing platform and communicatively coupled to the computing platform via a communication network, information indicating that the recipient device has generated an outbound character-limited message for transmission;

determine that the outbound character-limited message corresponds to a reply to a first character-limited message received by the recipient device from a sender, wherein the first character-limited message has been determined to include suspicious content;

based on determining that the outbound character-limited message corresponds to the reply to the first character-limited message that includes suspicious content, prevent transmission of the outbound character-limited message toward the sender;

generate a modified character-limited message by modifying a source number associated with the recipient device for the outbound character-limited message;

cause transmission of the modified character-limited message to the sender in place of the outbound character-limited message;

intercept a second character-limited message sent by the sender in response to the modified character-limited message and directed to the modified source number; and redirect the second character-limited message away from the recipient device.

2. The computing platform of claim 1, wherein the computing platform is external to a message flow pathway between the recipient device and the sender, and wherein the memory stores additional computer-readable instructions that, when executed by the at least one processor, cause the computing platform to:

based on receiving the information indicating that the recipient device has generated an outbound character-limited message for transmission, transmit an instruction, to a messaging service center, that causes the messaging service center to drop the outbound character-limited message sent in response to the recipient device receiving the first character-limited message from the sender and inject the modified character-limited message into the message flow pathway in place of the outbound character-limited message.

3. The computing platform of claim 1, wherein the memory stores additional computer-readable instructions that, when executed by the at least one processor, cause the computing platform to:

classify the first character-limited message as potential spam, spam, or non-spam.

4. The computing platform of claim 1, wherein redirecting the second character-limited message comprises redirecting the second character-limited message to a honeypot.

5. The computing platform of claim 1, wherein redirecting the second character-limited message comprises redirecting the second character-limited message to a security policy enforcement entity.

6. The computing platform of claim 1, wherein modifying the source number for generating the modified character-limited message comprises rewriting a phone number associated with the recipient device.

7. The computing platform of claim 6, wherein rewriting the phone number associated with the recipient device comprises rewriting the phone number to correspond to a honeypot.

8. The computing platform of claim 1, wherein the memory stores additional computer-readable instructions that, when executed by the at least one processor, cause the computing platform to:

train one or more machine learning algorithms using the intercepted second character-limited message received from the sender.

9. The computing platform of claim 1, wherein determining that the first character-limited message includes suspicious content includes:

prior to delivering the first character-limited message to the recipient device, modifying a second source number for the first character-limited message sent to the recipient device, and wherein delivering the first character-limited message to the recipient device includes sending the first character-limited message with the modified second source number to the recipient device, the modified second source number indicating that the first character-limited message comprises suspicious content.

10. The computing platform of claim 1, wherein the first character-limited message comprises at least one of a short message service (SMS) message or a multimedia messaging service (MMS) message.

11. A method, comprising:

at a computing platform comprising at least one processor, a communication interface, and memory:

receiving, by the at least one processor, from a recipient device different from the computing platform and communicatively coupled to the computing platform via a communication network, information indicating that the recipient device has generated of an outbound character-limited message for transmission;

determining that the outbound character-limited message corresponds to a reply to a first character-limited message received by the recipient device from a sender, wherein the first character-limited message has been determined to include suspicious content;

based on determining that the outbound character-limited message corresponds to the reply to the first character-limited message that includes suspicious content, preventing transmission of the outbound character-limited message toward the sender;

generating, by the at least one processor, a modified character-limited message by modifying a source number associated with the recipient device for the outbound character-limited message;

causing transmission, by the at least one processor, of the modified character-limited message to the sender in place of the outbound character-limited message;

intercepting, by the at least one processor, a second character-limited message sent by the sender in response to the modified character-limited message and directed to the modified source number; and redirecting, by the at least one processor, the second character-limited message away from the recipient device.

12. The method of claim 11, wherein the computing platform is external to a message flow pathway between the recipient device and the sender, and wherein the method further comprises:

based on receiving the information indicating that the recipient device has generated of an outbound character-limited message for transmission, transmitting an instruction, to a messaging service center, that causes the messaging service center to drop the outbound character-limited message sent in response to the recipient device receiving the first character-limited message from the sender and inject the character-limited message with the modified source number into the message flow pathway.

13. The method of claim 11, further comprising:

classifying the first character-limited message as potential spam, spam, or non-spam.

14. The method of claim 11, wherein redirecting the second character-limited message comprises redirecting the second character-limited message to a honeypot.

15. The method of claim 11, wherein redirecting the second character-limited message comprises redirecting the second character-limited message to a security policy enforcement entity.

16. The method of claim 11, wherein modifying the source number for generating the modified character-limited message comprises rewriting a phone number associated with the recipient device.

17. The method of claim 16, wherein rewriting the phone number associated with the recipient device comprises rewriting the phone number to correspond to a honeypot.

18. The method of claim 11, further comprising:

training one or more machine learning algorithms using the intercepted second character-limited message received from the sender.

19. The method of claim 11, wherein determining that the first character-limited message includes suspicious content includes:

prior to delivering the first character-limited message to the recipient device, modifying a second source number for the first character-limited message sent to the recipient device, and wherein delivering the first character-limited message to the recipient device includes sending the first character-limited message with the modified second source number to the recipient device, the modified second source number indicating that the first character-limited message comprises suspicious content.

20. One or more non-transitory computer-readable media storing instructions that, when executed by a computing platform comprising at least one processor, a communication interface, and memory, cause the computing platform to:

receive, from a recipient device different from the computing platform and communicatively coupled to the computing platform via a communication network, information indicating that the recipient device has generated an outbound character-limited message for transmission;

determine that the outbound character-limited message corresponds to a reply to a first character-limited message received by the recipient device from a sender, wherein the first character-limited message has been determined to include suspicious content;

based on determining that the outbound character-limited message corresponds to the reply to the first character-limited message that includes suspicious content, prevent transmission of the outbound character-limited message toward the sender;

generate a modified character-limited message by modifying a source number associated with the recipient device for the outbound character-limited message;

cause transmission of the modified character-limited message to the sender in place of the outbound character-limited message;

intercept a second character-limited message intended for the recipient device and sent by the sender in response to the modified character-limited message and directed to the modified source number; and redirect the second character-limited message away from the recipient device.

21. The computing platform of claim 1, wherein the memory stores additional computer-readable instructions that, when executed by the at least one processor, cause the computing platform to:

transmit a notification to the recipient device indicating that the recipient device sent a reply to a message determined to include suspicious content and that additional messages from the sender will be blocked.

* * * * *